US009571779B2

(12) United States Patent
Ling (10) Patent No.: US 9,571,779 B2
(45) Date of Patent: Feb. 14, 2017

(54) METHOD AND SYSTEM FOR DIVERSITY COMBINING FOR HIGH-PERFORMANCE SIGNAL RECEPTION

(71) Applicant: MaxLinear, Inc., Carlsbad, CA (US)

(72) Inventor: Curtis Ling, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 28 days.

(21) Appl. No.: 14/156,779

(22) Filed: Jan. 16, 2014

(65) Prior Publication Data

US 2014/0198258 A1 Jul. 17, 2014

Related U.S. Application Data

(60) Provisional application No. 61/753,188, filed on Jan. 16, 2013.

(51) Int. Cl.
| | |
|---|---|
| *H04N 5/45* | (2011.01) |
| *H04N 5/44* | (2011.01) |
| *H04N 5/50* | (2006.01) |
| *H04B 7/08* | (2006.01) |
| *H04N 5/455* | (2006.01) |
| *H04N 21/426* | (2011.01) |
| *H04N 21/438* | (2011.01) |
| *H04N 21/61* | (2011.01) |

(52) U.S. Cl.
CPC ............ *H04N 5/455* (2013.01); *H04B 7/0837* (2013.01); *H04N 5/4401* (2013.01); *H04N 5/50* (2013.01); *H04N 21/4263* (2013.01); *H04N 21/4382* (2013.01); *H04N 21/4383* (2013.01); *H04N 21/6112* (2013.01)

(58) Field of Classification Search
USPC ........................................................ 348/726
See application file for complete search history.

(56) References Cited

U.S. PATENT DOCUMENTS

| | | | | |
|---|---|---|---|---|
| 8,654,262 | B2 * | 2/2014 | Du Val et al. ................ | 348/725 |
| 2004/0252243 | A1 * | 12/2004 | Stewart .................... | H04N 5/44 348/725 |

(Continued)

*Primary Examiner* — Michael Teitelbaum
(74) *Attorney, Agent, or Firm* — McAndrews, Held & Malloy, Ltd.

(57) ABSTRACT

A terrestrial receiver at a premises includes a plurality of antennas and a corresponding plurality of tuners. The terrestrial receiver receives terrestrial television signals via the plurality of antennas and the plurality of tuners and diversity combines a corresponding plurality of terrestrial television channels within the received terrestrial television signals, for example, based on control signals received from one or more customer premises equipment (CPE). The terrestrial receiver processes the diversity combined corresponding plurality of terrestrial television channels and communicates the processed and diversity combined corresponding plurality of terrestrial television channels to the one or more CPE. The diversity combined corresponding plurality of terrestrial television channels may be remodulated, and converted to corresponding analog signals prior to being communicated to the one or more CPE. The diversity combined corresponding plurality of terrestrial television channels may be demodulated and converted to intermediate frequency signals prior to being communicated to the one or more CPE.

16 Claims, 8 Drawing Sheets (56) References Cited

U.S. PATENT DOCUMENTS

| | | | |
|---|---|---|---|
| 2008/0060024 A1* | 3/2008 | Decanne | 725/72 |
| 2008/0096509 A1* | 4/2008 | Ling | 455/273 |
| 2008/0238808 A1* | 10/2008 | Arita et al. | 343/893 |
| 2009/0286472 A1* | 11/2009 | Eidenschink et al. | 455/12.1 |
| 2013/0135534 A1* | 5/2013 | Murakami et al. | 348/726 |

* cited by examiner

METHOD AND SYSTEM FOR DIVERSITY COMBINING FOR HIGH-PERFORMANCE SIGNAL RECEPTION

CROSS-REFERENCE TO RELATED APPLICATIONS/INCORPORATION BY REFERENCE

This patent application makes reference to, claims priority to and claims benefit from the U.S. Provisional Patent Application Serial No. 61/753,188, filed on Jan. 16, 2013.

This patent application also makes reference to:
U.S. Pat. No. 8,010,070, which issued on Aug. 30, 2011;
U.S. application Ser. No. 13/762,929, entitled "Method and System for Integrated Stacking for Handling Channel Stacking or Band Stacking," which was filed on Feb. 8, 2013;
U.S. application Ser. No. 13/906,933, filed on May 21, 2013, entitled "Combined Terrestrial And Satellite Content For A Seamless User Experience," which in turn claims priority to U.S. Provisional Patent Application Ser. No. 61/658,445, filed on Jun. 12, 2012; and
U.S. application Ser. No. 13/762,939, having the title of "Method And System For Combined Terrestrial And Satellite Content For A Seamless User Experience," which was filed on Feb. 8, 2013.

Each of the above stated applications is hereby incorporated herein by reference in its entirety.

FIELD OF THE INVENTION

Certain embodiments of the invention relate to signal processing. More specifically, certain embodiments of the invention relate to a method and system for diversity combining for high-performance signal reception.

BACKGROUND OF THE INVENTION

Existing methods and systems for delivery of non-satellite content (e.g., terrestrial content) to satellite customers can be costly, cumbersome, power hungry, expensive, inflexible and inefficient.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for diversity combining for high-performance signal reception, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the disclosure may be found in a method and system for diversity combining for high-performance signal reception. In various embodiments of the disclosure, a terrestrial receiver at a premises includes a plurality of antennas and a corresponding plurality of tuners. The corresponding plurality of tuners may comprise full spectrum capture receivers. The terrestrial receiver may receive terrestrial television signals via the plurality of antennas and the plurality of tuners and diversity combine a corresponding plurality of terrestrial television channels within the received terrestrial television signals. The terrestrial receiver may process the diversity combined corresponding plurality of terrestrial television channels and communicate the processed diversity combined corresponding plurality of terrestrial television channels to one or more customer premises equipment. The diversity combined corresponding plurality of terrestrial television channels may be remodulated, and converted to corresponding analog signals prior to being communicated to the one or more customer premises equipment. The diversity combined corresponding plurality of terrestrial television channels may be demodulated and converted to intermediate frequency signals prior to being communicated to the one or more customer premises equipment. The terrestrial receiver may receive one or more control signals from the one or more customer premises equipment. One or more first of the plurality of terrestrial television channels within the received terrestrial television signals may be diversity combined based on the received one or more control signals from the one or more customer premises equipment. The diversity combined one or more first of the plurality of terrestrial television channels may be converted to corresponding first analog signals. A radio frequency combiner that may be communicatively coupled to or integrated within the terrestrial receiver may receive one or more second plurality of terrestrial television channels. The radio frequency combiner may be operable to radio frequency combine the corresponding first analog signals and the received one or more second plurality of terrestrial television channels. The one or more first of the plurality of terrestrial television channels are different from the one or more second plurality of terrestrial television channels that may be received by the radio frequency combiner. The combined corresponding first analog signals and the received one or more second plurality of terrestrial television channels may be communicated to the one or more customer premises equipment. The diversity combining of the corresponding plurality of terrestrial television channels within the received terrestrial television signals may utilize coarse FFT processing. The diversity combining of the corresponding plurality of terrestrial television channels within the received terrestrial television signals may combine a plurality of the terrestrial television signals from a plurality of frequency bins for the plurality of antennas to generate maximum ratio combined co-phased signals. The diversity combining of the corresponding plurality of terrestrial television channels within the received terrestrial television signals performs channel stacking and/or band stacking on the plurality of frequency bins.

Figure 1:
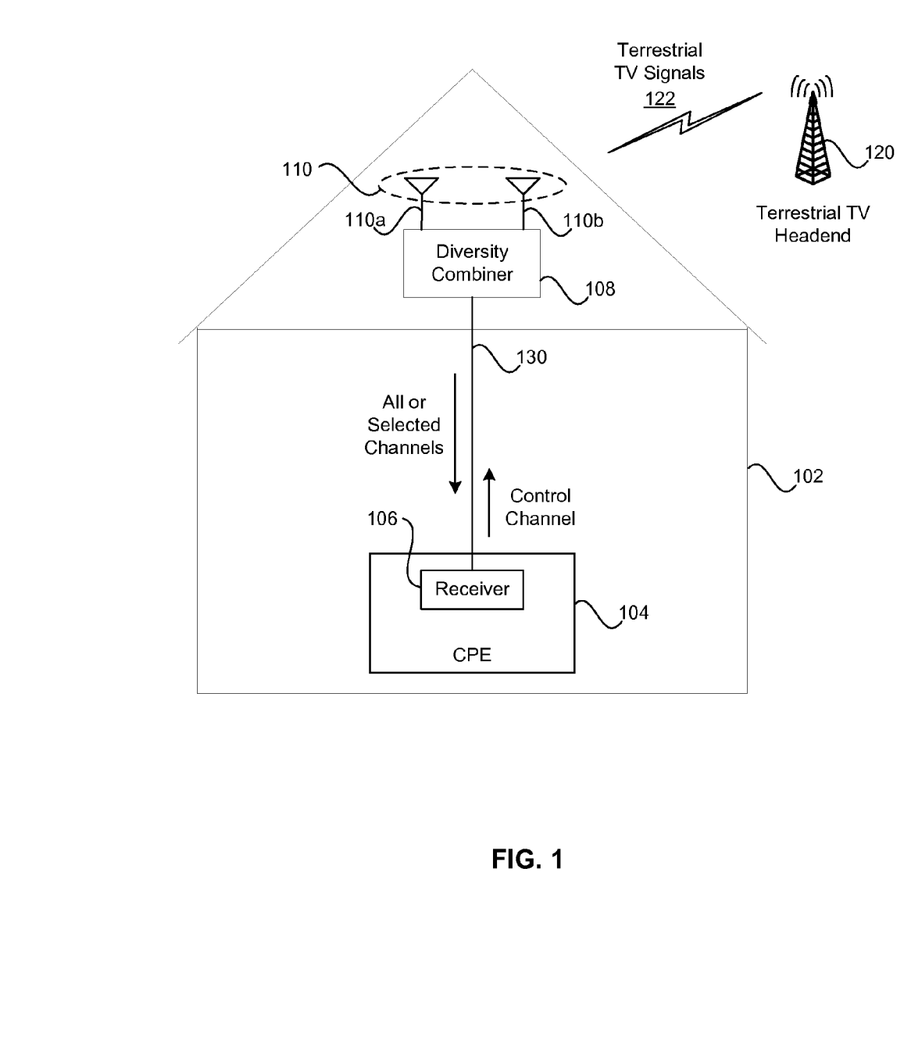
FIG. 1 is a block diagram illustrating an exemplary system for providing diversity combining for high-performance signal reception, in accordance with an exemplary embodiment of the disclosure.

FIG. 1 is a block diagram illustrating an exemplary system for providing diversity combining for high-performance signal reception, in accordance with an exemplary embodiment of the disclosure. Referring to FIG. 1, there is shown customer premises 102, customer premises equipment 104, diversity combiner 108, a plurality of antennas 110a, 110b, a terrestrial TV headend 120, and medium 130. The plurality of antennas 110a, 110b may be collectively referenced as 110. The customer premise equipment 104 may comprise a receiver 106.

The customer premises 102 may comprise a home, office, multiple-dwelling unit or other type of building. The customer premises equipment 104, the diversity combiner 108, and the antennas 110 may be located at the customer premises 102.

The plurality of antennas 110a, 110b may be operable to receive terrestrial signals such as terrestrial television signals 122. The terrestrial television signals 122 may be generated by the terrestrial TV headend 120. The received signals may be communicated to the diversity combiner 108. One or more of the antennas 110a, 110b may, for example, be mounted in an attic and/or on a roof of the customer premises 102. It should be recognized that although only 2 antennas 110a, 110b are illustrated, the disclosure is not limited in this regard. Accordingly, various embodiments of the disclosure may utilize more than two antennas without departing from the spirit and scope of the various embodiments of the disclosure. In instances where more than two antenna are utilized, a corresponding number of full spectrum receivers may also be utilized.

The diversity combiner 108 may comprise suitable logic, circuitry, interfaces and/or code that may be operable to diversity combine the signals that are received via the plurality of antennas 110. The diversity combiner 108 may be operable to output the resulting combined signals to the customer premises equipment 104. The diversity combiner 108 may also comprise circuitry that may be utilized to configure, control and/or manage its operation. The diversity combiner 108 may, for example, be integrated in a common housing with one or both of the antennas 110a, 110b and/or may be an in-line module which may, for example, be coupled to the antennas via coaxial cable. In this regard, the coaxial cable may comprise regular coaxial cable or thin coaxial cable. The resulting combined signals generated by the diversity combiner 108 may be communicated to the customer premise equipment via a coaxial cable.

The diversity combiner 108 may also be operable to receive one or more signals, from the customer premises equipment 104, which may be utilized to configure, control and/or manage operation of the diversity combiner 108. The diversity combiner 108 may be operable to communicate with the customer premises equipment 104 via one or more exemplary standards and/or protocols such as Ethernet, USB, Wi-Fi, a power-line communication protocol, DiSeqC, frequency shift keying, and/or the like. In this regard, the diversity combiner 108 may be operable to utilize the one or more standards and/or protocols to receive the one or more signals, from the customer premises equipment 104, which are utilized to configure, control and/or manage the operation of the diversity combiner 108. In some embodiments of the disclosure, the diversity combiner 108 may also be operable to report status and/or signal information to the customer premises equipment 104.

The customer premises equipment 104 may comprise suitable logic, circuitry, interfaces and/or code that may be operable to receive diversity combined signals from the diversity combiner 108. The customer premises equipment 104 may comprise, for example, a set-top box (STB) or a television. In instances where the customer premises equipment 104 may comprise a television, the customer premises equipment 104 may be operable to consume content in the receive diversity combined signals. In instances where the customer premises equipment 104 comprises a STB, the customer premises equipment 104 may be operable to demodulate the received diversity combined signals. The corresponding content for the demodulated diversity combined signals may be communicated to and consumed by a television or monitor that is communicatively coupled to the STB. The customer premises equipment 104 may be communicatively coupled to the diversity combiner 108 via the medium 230, which may comprise, for example, a coaxial cable. The medium 230 may transport all or selected channels and/or more selected control channels.

The customer premises equipment 104 may also be operable to configure, control and/or manage operation of the diversity combiner 108. In this regard, the customer premises equipment 104 may be operable to generate one or more control signals that may be utilized to configure, control and/or manage operation of the diversity combiner 108. The customer premises equipment 104 may be operable to utilize exemplary standards and/or protocols such as Ethernet, USB, Wi-Fi, a power-line communication protocol, DiSeqC, frequency shift keying and/or the like, to configure, control and/or manage operation of the diversity combiner 108. For example, control signals, which may be encapsulated in packets, may be communicated via Ethernet from the receiver 106 to the diversity combiner 108 and utilized to configure, control and/or manage operation of the diversity combiner 108. In another example, control signals may be communicated from the receiver 106, via Ethernet, USB, Wi-Fi, a power-line communication protocol, DiSeqC, frequency shift keying and/or the like, to the diversity combiner 108 and utilized to configure, control and/or manage operation of the diversity combiner 108. In some embodiments of the disclosure, the customer premises equipment 104 may also be operable to receive status and/or signal information from the diversity combiner 108. For example, the customer premises equipment 104 may read one or more registers in the diversity combiner 108 in order to determine the status of the diversity combiner 108 and/or signals being processed by the diversity combiner 108. The customer premises equipment 104 may also be operable to write one or more registers in the diversity combiner 108 in order to configure and/or manage the operation of the diversity combiner 108.

The receiver 106, which may be located within the customer premises equipment 104, may comprise suitable logic, circuitry, interfaces and/or code that may be operable to receive and demodulate the diversity combined signals, which are generated by the diversity combiner 108.

In operation, the plurality of antennas 110 may be operable to receive signals, for example, the terrestrial signals 122 from the terrestrial television headend 120. The receive signals may be communicated to the diversity combiner 108. The diversity combiner 108 may be operable to diversity combine the signals that are received by the plurality of antennas 110. The resulting diversity combined signals may be communicated to the customer premises equipment 104, where it may be received and demodulated by the receiver 106.

Figure 2:
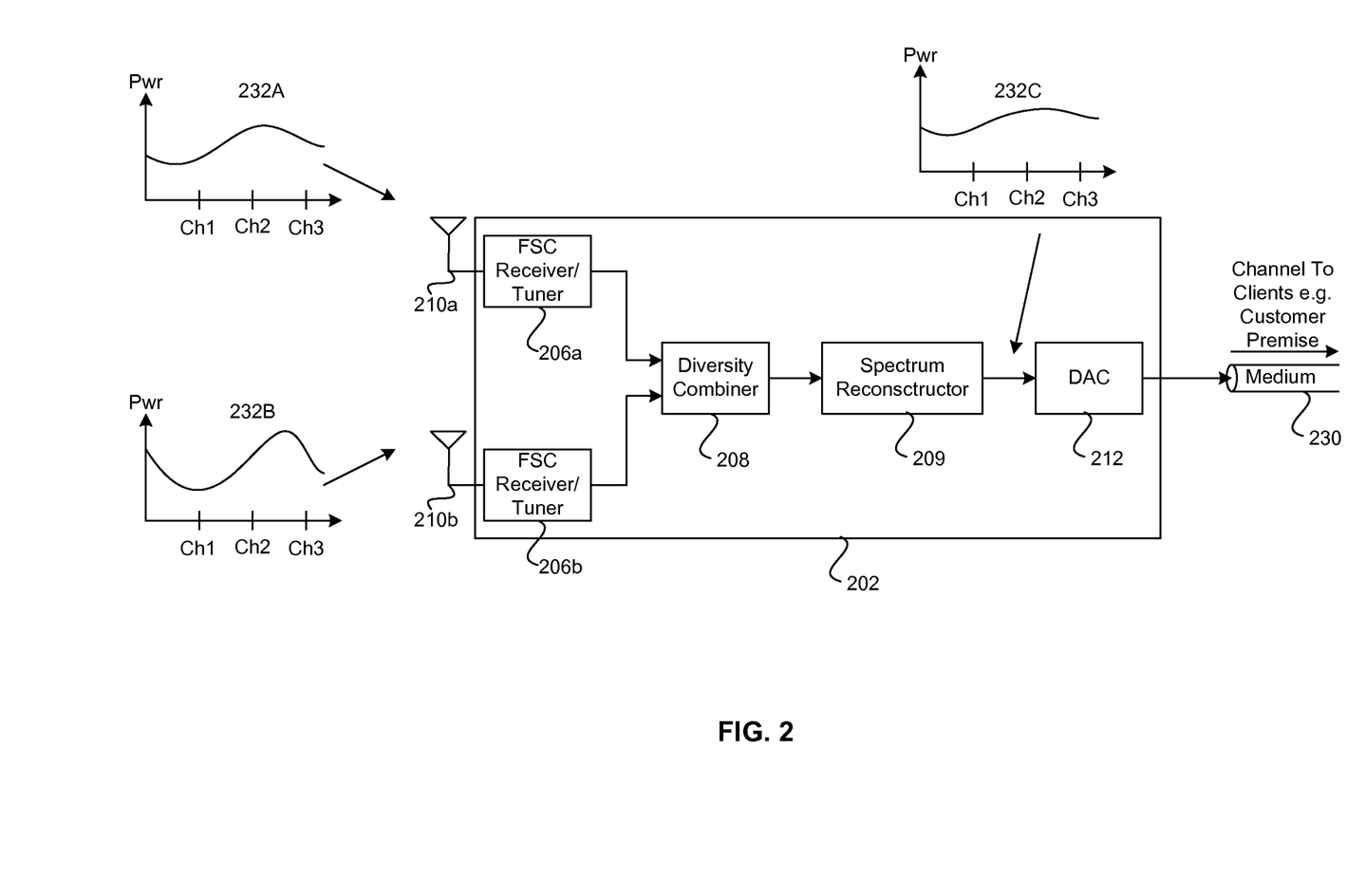
FIG. 2 is a block diagram illustrating an exemplary system in which diversity combining is utilized to reconstruct a signal spectrum for operation that is transparent to a receiver, in accordance with an exemplary embodiment of the disclosure.

FIG. 2 is a block diagram illustrating an exemplary system in which diversity combining is utilized to reconstruct a signal spectrum for operation that is transparent to a receiver, in accordance with an exemplary embodiment of the disclosure. Referring to FIG. 2, there is shown a receiver 202. The receiver 202 may comprise full spectrum capture (FSC) receivers 206a, 206b, a diversity combiner 208, a spectrum reconstructor 209, a digital to analog converter (DAC) 212, and a plurality of antennas 210a, 210b. The plurality of antennas 210a, 210b may be collectively referenced as antennas 210. FIG. 2 also illustrates a first replica of the spectrum for a plurality of received channels 232A, a second replica of the spectrum for a plurality of received channels 232B, and the reconstructed spectrum for the resulting combined plurality of channels 232C. The FSC receivers 206a, 206b may also be referred to as FSC tuners or tuners.

Each of the full spectrum capture (FSC) receivers 206a, 206b may comprise suitable logic, circuitry, interfaces and/or code that may be operable to capture and process terrestrial signals that are received via the plurality of antennas 210a, 210b, respectively. For example, the full spectrum capture receiver 206a may be operable to capture the entire terrestrial television spectrum or band from, for example, 54 MHz to 889.75 MHz. The full spectrum capture receiver 206a may channelize the terrestrial TV signals in the captured terrestrial television spectrum or band and the resulting channelized signals may be communicated to the receiver 106 (FIG. 1) in the customer premises equipment 104 (FIG. 1). In some embodiments of the disclosure, the full spectrum capture receiver 206a may convert the resulting channelized terrestrial TV signals to corresponding IF signals. The full spectrum capture receiver 206b may also be operable to capture the entire terrestrial television spectrum or band from, for example, 54 MHz to 889.75 MHz. The full spectrum capture receiver 206b may channelize the terrestrial TV signals in the captured terrestrial television spectrum or band and the resulting channelized signals may be communicated to the receiver 106 (FIG. 1) in the customer premise equipment 104 (FIG. 1). In some embodiments of the disclosure, the full spectrum capture receiver 206b may convert the resulting channelized terrestrial TV signals to corresponding IF signals.

The diversity combiner 208 may comprise suitable logic, circuitry, interfaces and/or code that may be operable to combine the channels in the resulting channelized terrestrial TV signals that are received from the full spectrum capture receivers 206a, 206b. In an exemplary embodiment of the disclosure, the diversity combiner 208 may comprise a maximum ratio combiner that may be operable to combine the channels that are output from the full spectrum capture receivers 206a, 206b. For example, the diversity combiner 208 may be operable to utilize, for example, a coarse FFT processing that employs a low complexity diversity using coarse FFT and subband-wise combining. The coarse FFT processing may optimally combine the signals from a plurality of frequency bins for multiple antennas and accordingly, generate an improved maximum ratio combined (MRC) co-phased signals. U.S. Pat. No. 8,010,070, (application Ser. No. 12/247,908), which issued on Aug. 30, 2011, discloses exemplary Low-Complexity Diversity Using Coarse FFT and Coarse Sub-band-wise Combining, and is hereby incorporated herein by reference in its entirety. The diversity combiner 208 may also be operable to utilize channel stacking and/or band stacking of the plurality of frequency bins. U.S. application Ser. No. 13/762,929, entitled "Method and System for Integrated Stacking for Handling Channel Stacking or Band Stacking," which was filed on Feb. 8, 2013, discloses an integrated stacking method and is hereby incorporated herein by reference in its entirety.

The spectrum reconstructor 209 may comprise suitable logic, circuitry, interfaces and/or code that may be operable to reconstruct the spectrum for each of the resulting diversity combined channels that may be output from the diversity combiner 208. In this regard, the spectrum reconstructor 209 may be operable to remodulate the signals that are output from the diversity combiner 208. The first replica of the spectrum for the plurality of received channels 232A is representative of the signals that are received by the antenna 210a. The second replica of the spectrum for the plurality of received channels 232B is representative of the signals that are received by the antenna 210b. The spectrum for the reconstructed combined plurality of channels 232C is representative of the reconstructed combined spectrum for each of the resulting diversity channels that are generated from the diversity combiner 208. In this regard, the spectrum for the reconstructed combined plurality of channels 232C is representative of the channelized signals that are output by the spectrum reconstructor 209.

The digital to analog converter 212 may comprise suitable logic, circuitry, interfaces and/or code that may be operable to convert the channelized digital signals in the spectrum for the reconstructed combined plurality of channels 232C, which are generated by the spectrum reconstructor 209, to corresponding analog channelized signals. The corresponding analog signals may be communicated via the medium 230 to, for example, a customer premises.

In operation, the receiver 202 comprises a diversity combiner 208 that utilizes diversity combining to reconstruct a signal spectrum for operation that is transparent to the customer premises equipment downstream of the diversity combiner 208. Each of the antennas 210a, 210b receives signals, for example, from terrestrial television channels, in the frequency band comprising channels 1, 2 and 3. Although two antennas and three channels are chosen for illustration, this disclosure is not limited in this regard. Accordingly, the number of antennas and/or channels may vary. The output of each antenna of the antennas 210a, 210b may be communicated to respective full spectrum capture receivers 206a, 206b. Each of the full spectrum capture receivers 206a, 206b may be operable to amplify, down-convert (if desired and/or necessary), and digitize the full spectrum of the communication standard of interest. For example, for terrestrial television, each of the full spectrum capture receivers 206a, 206b may be operable to amplify and digitize the entire terrestrial television spectrum from, for example, 54 MHz to 889.75 MHz. In the example that is shown in FIG. 2, it is assumed for simplicity that the full spectrum comprises only channels 1-3, even though the invention is not limited in this regard. The digitized signals output by each of the full spectrum capture receivers 206a, 206b may be communicated to the diversity combiner 208, which may perform diversity combining of the two digitized signals. The diversity combining may be, for example, course FFT subband-wise combining as is described in U.S. patent application Ser. No. 12/335,649, which is hereby incorporated herein by reference in its entirety.

The resulting combined signal that is generated from the output of the diversity combiner 208 may be communicated to the spectrum reconstructor 209 which may, for example, re-modulate the data output by the diversity combiner in accordance with the standards/protocols of the original signals received by the antenna 210a, 210b. Exemplary standards/protocols of the original signals received by the antenna 210a, 210b may comprise ATSC and QAM standards. The output of the spectrum reconstructor 209 may then be communicated to the digital to analog converter 212. The digital to analog converter 212 may be operable to convert the output of the spectrum reconstructor 209 to corresponding analog signals, which may be transmitted to the various customer premises equipment via a medium 230 (e.g., a coaxial cable). In this manner, the presence of the diversity combiner 208 may be transparent to the customer premises equipment.

Figure 3:
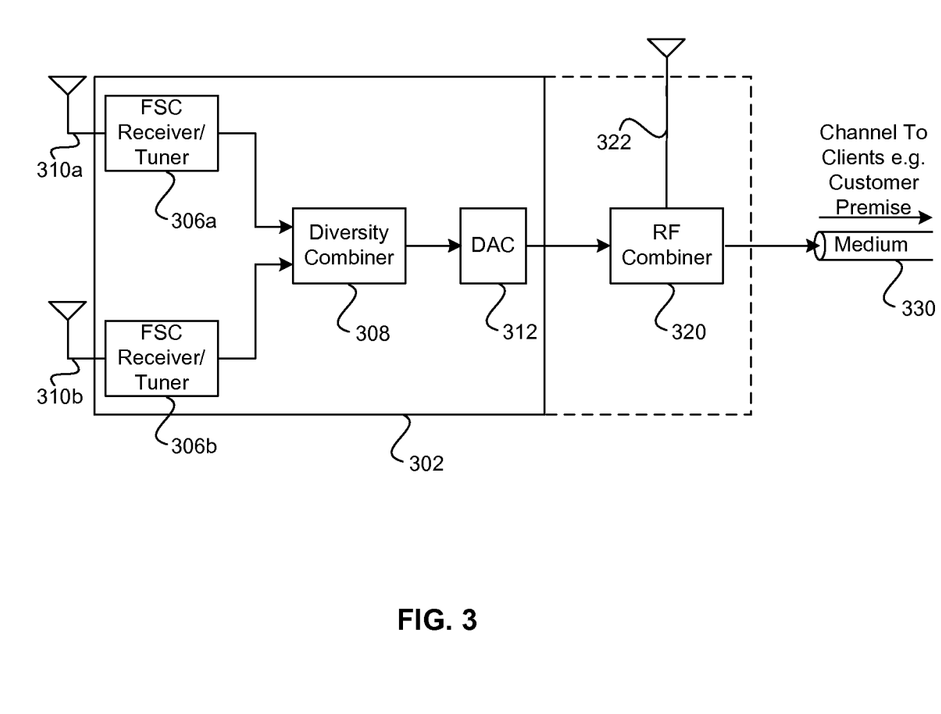
FIG. 3 depicts an exemplary system in which diversity combining is used to reconstruct a signal spectrum for operation that is transparent to a receiver, in accordance with an exemplary embodiment of the disclosure.

FIG. 3 depicts an example system in which diversity combining is used to reconstruct a signal spectrum for operation that is transparent to a receiver, in accordance with an exemplary embodiment of the disclosure. Referring to FIG. 3, there is shown a receiver 302. The receiver 302 may comprise full spectrum capture (FSC) receivers 306a, 306b, a diversity combiner 308, a digital to analog converter (DAC) 312, a plurality of antennas 310a, 310b, 322, and an RF combiner 320. The plurality of antennas 310a, 310b may be collectively referenced as antennas 310.

Each of the full spectrum capture (FSC) receivers 306a, 306b may comprise suitable logic, circuitry, interfaces and/or code that may be operable to capture and process terrestrial signals that are received via the plurality of antennas 310a, 310b, respectively. For example, the full spectrum capture receiver 306a may be operable to capture the entire terrestrial television spectrum or band from, for example, 54 MHz to 889.75 MHz. The full spectrum capture receiver 306a may channelize the terrestrial TV signals in the captured terrestrial television spectrum or band and the resulting channelized signals may be communicated to the receiver 106 (FIG. 1) in the customer premise equipment 104 (FIG. 1). In some embodiments of the disclosure, the full spectrum capture receiver 306a may convert the resulting channelized terrestrial TV signals to corresponding IF signals. The full spectrum capture receiver 306b may also be operable to capture the entire terrestrial television spectrum or band from, for example, 54 MHz to 889.75 MHz. The full spectrum capture receiver 306b may channelize the terrestrial TV signals in the captured terrestrial television spectrum or band and the resulting channelized signals may be communicated to the receiver 106 (FIG. 1) in the customer premises equipment 104 (FIG. 1). In some embodiments of the disclosure, the full spectrum capture receiver 306b may convert the resulting channelized terrestrial TV signals to corresponding IF signals. The full spectrum capture receivers 306a, 306b may be narrowband receivers relative to the spectrum of the type of signals to be received (e.g., ATSC).

The diversity combiner 308 may comprise suitable logic, circuitry, interfaces and/or code that may be operable to combine the channels in the resulting channelized terrestrial TV signals that are received from the full spectrum capture receivers 306a, 306b. In an exemplary embodiment of the disclosure, the diversity combiner 308 may comprise a maximum ratio combiner that may be operable to combine the channels that are output from the full spectrum capture receivers 306a, 306b. For example, the diversity combiner 308 may be operable to utilize, for example, a coarse FFT processing that employs a low complexity diversity using coarse FFT and subband-wise combining. The coarse FFT processing may optimally combine the signals from a plurality of frequency bins for multiple antennas and accordingly, generate an improved maximum ratio combined (MRC) co-phased signals. U.S. Pat. No. 8,010,070, (application Ser. No. 12/247,908), which issued on Aug. 30, 2011, discloses exemplary Low-Complexity Diversity Using Coarse FFT and Coarse Sub-band-wise Combining, and is hereby incorporated herein by reference in its entirety. The diversity combiner 308 may also be operable to utilize channel stacking and/or band stacking of the plurality of frequency bins. U.S. application Ser. No. 13/762,929, entitled "Method and System for Integrated Stacking for Handling Channel Stacking or Band Stacking," which was filed on Feb. 8, 2013, discloses an integrated stacking method and is hereby incorporated herein by reference in its entirety.

The digital to analog converter 312 may comprise suitable logic, circuitry, interfaces and/or code that may be operable to convert the channelized digital signals in the spectrum for the combined plurality of channels, which are generated by the diversity combiner 312, to corresponding analog channelized signals. The corresponding analog signals from the digital to analog converter 312 may be communicated to the RF combiner 320 for processing.

The RF combiner 320 may be operable to combine the RF signals that are received via the antenna 322 with the analog signals that are generated by the digital to analog converter 312. In this regard, the RF combiner 320 may be operable to combine signals that may not require diversity combining by the diversity combiner 308. In some exemplary embodiments of the disclosure, signals that are received via the antennas 310a, 310b that may not require diversity combining are filtered out and combined at the RF combiner 320. The resulting combined RF signals may be communicated to the customer premises equipment via the medium 330, which may comprise coaxial cable, for example.

In operation, the receiver 302 comprises a diversity combiner 308 that utilizes diversity combining to reconstruct a signal spectrum for operation that is transparent to the customer premises equipment downstream of the diversity combiner 308. Each of the antennas 310a, 310b may be operable to receive signals, for example, terrestrial television channels, in the frequency band comprising a plurality of channels. Although two antennas are chosen for illustration, this disclosure is not limited in this regard. Accordingly, the number of antennas may vary. The output of each antenna of the antennas 310a, 310b may be communicated to respective full spectrum capture receivers 306a, 306b. Each of the full spectrum capture receivers 306a, 306b may be operable to amplify, down-convert (if desired and/or necessary), and digitize the full spectrum of the communication standard of interest. For example, for terrestrial television, each of the full spectrum capture receivers 306a, 306b may be operable to amplify and digitize the entire terrestrial television spectrum from, for example, 54 MHz to 889.75 MHz. The digitized signals output by each of the full spectrum capture receivers 306a, 306b may be communicated to the diversity combiner 308, which may perform diversity combining of the two digitized signals. The diversity combining may comprise, for example, course FFT subband-wise combining as is described in U.S. patent application Ser. No. 12/335,649, which is hereby incorporated herein by reference in its entirety.

The resulting combined signal that is generated from the output of the diversity combiner 308 may be received by the digital to analog converter 312, and converted to corresponding analog signals. The corresponding analog signals may be transmitted to the various customer premises equipment via the medium 330, which may comprise, for example, coaxial cable. In this manner, the presence of the diversity combiner 208 may be transparent to the customer premises equipment.

In some implementations where the diversity combiner 308 may not have the capacity to capture the entire spectrum, one or more customer premises equipment may be operable to communicate control signals to the diversity combiner 308 to indicate which channel(s) should be processed and output by the diversity combiner. 308

In another implementation, the diversity combiner 308 may be operable to analyze the characteristics of the received signals. In this regard, the diversity combiner 308 may autonomously select which channels or portion(s) of the spectrum it processes based on determined characteristics of the received signals. In such an implementation, the full spectrum capture receivers 306a, 306b may be operable to sweep the spectrum of interest, identify the N (an integer) strongest channels/portions, and select and process those N channels/portions. Alternatively, the diversity combiner 308 may be operable to sweep the spectrum and identify the N channels/portions that it determines (e.g., based on SNR and/or some other metric) can be most improved by diversity combining. For example, the full spectrum capture receivers may be operable to tune two of the three channels and it may be determined that channel 1 may be received directly without aid of diversity combining, whereas channels 2 and 3 may benefit from diversity combining. Accordingly, the full spectrum capture receivers 306a, 306b may be configured to tune to channels 2 and 3 and the output of the DAC 312 may be a reconstructed spectrum in which the strength and/or quality of channels 2 and 3 have been significantly improved. In some embodiments of the disclosure, channel 1 may be filtered out in the signal output by the diversity combiner 308 and channel 1 may then be added to the signal via an RF combiner 320.

As in the implementation of FIG. 2A, the placement of the channels on the medium to which the customer premises equipment is coupled may be the same as if the diversity combiner were not present. In another implementation, selected channels/portions may be put on different frequencies than the frequency at which the channel/portion is received by the antennas. For example, channel three may be transmitted over the air at 76 to 82 MHz but, after diversity combining, it may be output to the CPE at 60 to 66 MHz (or some other frequency supported and/or expected by the CPE).

In another example implementation, the user of the diversity combiner 308 may manually configure the diversity combiner 308, (e.g., at installation time), to select the user's N favorite channels.

Figure 4:
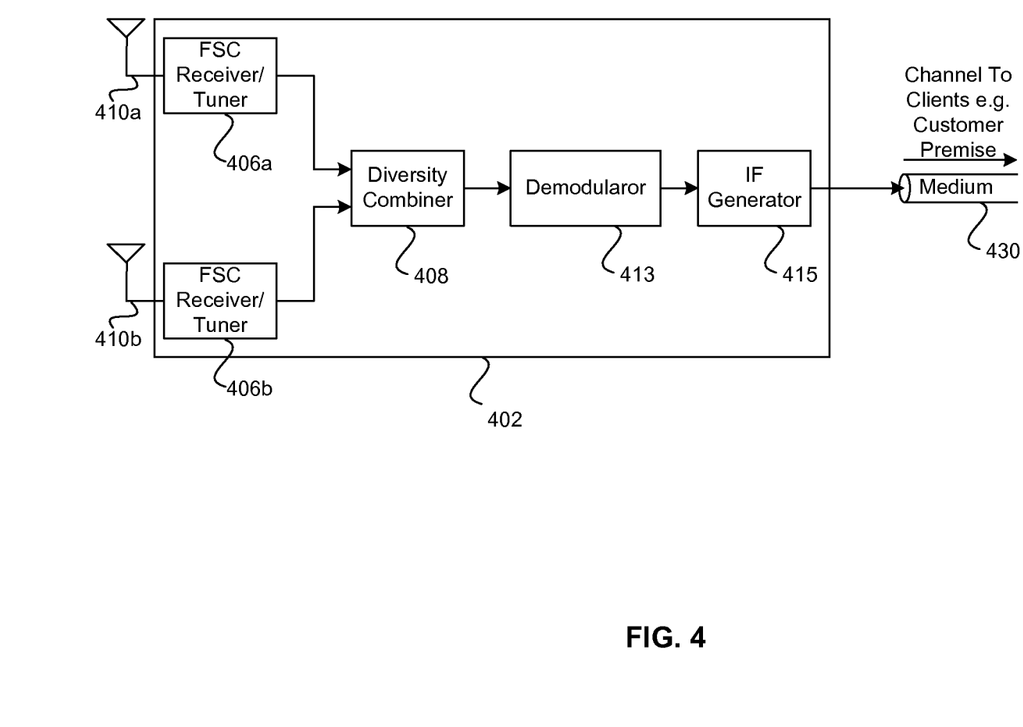
FIG. 4 is a block diagram illustrating an exemplary system in which diversity combined signals are re-modulated for transmission to a receiver, in accordance with an exemplary embodiment of the disclosure.

FIG. 4 is a block diagram illustrating an exemplary system in which diversity combined signals are re-modulated for transmission to a receiver, in accordance with an exemplary embodiment of the disclosure. Referring to FIG. 4, there is shown a receiver 402. The receiver 402 may comprise full spectrum capture (FSC) receivers 406a, 406b, a diversity combiner 408, a plurality of antennas 410a, 410b, a demodulator 413, and an IF generator 415. The plurality of antennas 410a, 410b may be collectively referenced as antennas 410.

Each of the full spectrum capture (FSC) receivers 406a, 406b may comprise suitable logic, circuitry, interfaces and/or code that may be operable to capture and process terrestrial signals that are received via the plurality of antennas 410a, 410b, respectively. For example, the full spectrum capture receiver 406a may be operable to capture the entire terrestrial television spectrum or band from, for example, 54 MHz to 889.75 MHz. The full spectrum capture receiver 406a may channelize the terrestrial TV signals in the captured terrestrial television spectrum or band and the resulting channelized signals may be communicated to the receiver 106 (FIG. 1) in the customer premises equipment 104 (FIG. 1). In some embodiments of the disclosure, the full spectrum capture receiver 406a may convert the resulting channelized terrestrial TV signals to corresponding IF signals. The full spectrum capture receiver 406b may also be operable to capture the entire terrestrial television spectrum or band from, for example, 54 MHz to 889.75 MHz. The full spectrum capture receiver 406b may channelize the terrestrial TV signals in the captured terrestrial television spectrum or band and the resulting channelized signals may be communicated to the receiver 106 (FIG. 1) in the customer premises equipment 104 (FIG. 1). In some embodiments of the disclosure, the full spectrum capture receiver 406b may convert the resulting channelized terrestrial TV signals to corresponding IF signals. The full spectrum capture receivers 410a, 410b may be narrowband receivers relative to the spectrum of the type of signals to be received (e.g., ATSC).

The diversity combiner 408 may comprise suitable logic, circuitry, interfaces and/or code that may be operable to combine the channels in the resulting channelized terrestrial TV signals that are received from the full spectrum capture receivers 406a, 406b. In an exemplary embodiment of the disclosure, the diversity combiner 408 may comprise a maximum ratio combiner that may be operable to combine the channels that are output from the full spectrum capture receivers 406a, 406b. For example, the diversity combiner 408 may be operable to utilize, for example, a coarse FFT processing that employs a low complexity diversity using coarse FFT and subband-wise combining. The coarse FFT processing may optimally combine the signals from a plurality of frequency bins for multiple antennas and accordingly, generate an improved maximum ratio combined (MRC) co-phased signals. U.S. Pat. No. 8,010,070, (application Ser. No. 12/247,908), which issued on Aug. 30, 2011, discloses exemplary Low-Complexity Diversity Using Coarse FFT and Coarse Sub-band-wise Combining, and is hereby incorporated herein by reference in its entirety. The diversity combiner 408 may also be operable to utilize channel stacking and/or band stacking of the plurality of frequency bins. U.S. application Ser. No. 13/762,929, entitled "Method and System for Integrated Stacking for Handling Channel Stacking or Band Stacking," which was filed on Feb. 8, 2013, discloses an integrated stacking method and is hereby incorporated herein by reference in its entirety.

The demodulator 413 may comprise suitable logic, circuitry, interfaces and/or code that may be operable to demodulate one or more channels that may be output from the diversity combiner 408. In some embodiments of the disclosure, there may be instances when there is an insufficient number of the demodulators 413 to demodulate the channels that may be selected and processed by the full spectrum capture receivers 406a, 406b and the diversity combiner 408. In such instances, the demodulator 413 may select or choose which channels should be processed and demodulated. In this regard, the demodulator 413 may (1) receive a control signal from one or more customer premises equipment, (2) determine a pre-configuration setting that may be specified by a user, (3) perform channel selection based on a scan of the spectrum or one more frequency bands, and/or (4) utilize any other suitable methods for selecting or choosing which channels to process and demodulate The IF generator 415 may comprise suitable logic, circuitry, interfaces and/or code that may be operable to convert the corresponding demodulated signals, for the selected or chosen channels, which are generated by the demodulator 413, to suitable intermediate frequency signals, which may be communicate to the customer premises equipment via the medium 430. In this regard, the IF generator 415 may be operable to remodulate the demodulated signals, for the selected or chosen channels, which are output from the demodulator 413, to for example, ATSC signals that correspond to the intermediate frequency signals.

In operation, the diversity combiner 408 may be operable to diversity combine the channelized signals that may be output from the full spectrum capture receivers 406a, 406b. The demodulators 413 may be operable to demodulate selected ones of the channelized signals that may be output from the full spectrum capture receivers 406a, 406b. In some embodiments of the disclosure, in instances where there are insufficient demodulators to demodulate all of the channels that may be output from the full spectrum capture receivers 406a, 406b, one or more control signals from one or more customer premises equipment, a pre-configuration by a user, a channel selection based on a scan of the spectrum, and/or any other suitable methods may be utilized to choose which channels should be processed and demodulated by the demodulator 413. The chosen demodulated channels may then be converted to suitable intermediate frequency by the IF generator 415 and output to the customer premises equipment via the medium 430. The IF generator 415 may be operable to remodulate the chosen demodulated channels (e.g., according to ATSC) for transmission to the customer premise equipment via the medium 430. In another embodiment of the disclosure, the demodulated data may be transmitted in accordance with other standards/protocols such as Ethernet, MoCA, Wi-Fi, etc.

Figure 5:
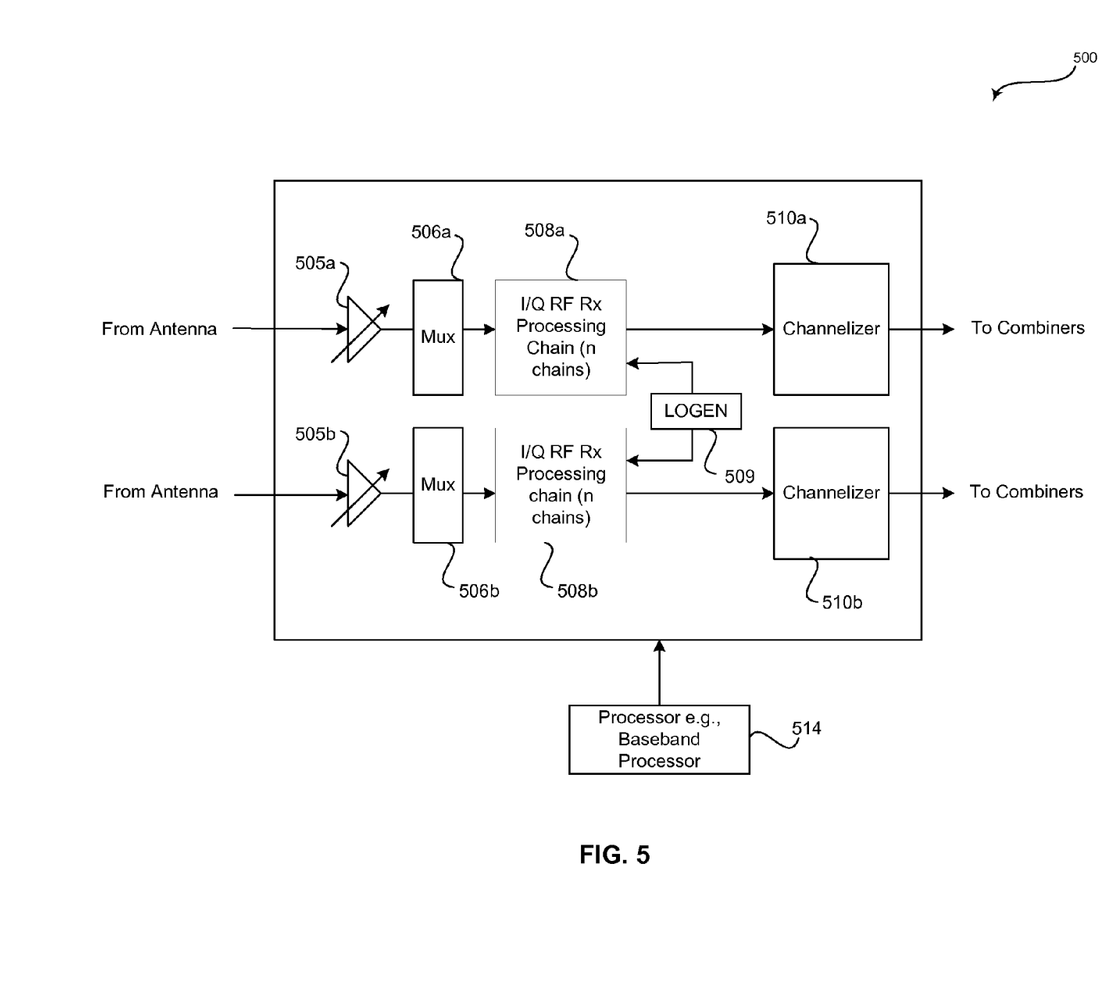
FIG. 5 is a block diagram illustrating an exemplary full spectrum capture (FSC) receiver, in accordance with an exemplary embodiment of the disclosure.

FIG. 5 is a block diagram of an exemplary full spectrum capture receiver, in accordance with an exemplary embodiment of the disclosure. Referring to FIG. 5, there is shown a full spectrum capture receiver 500. The full spectrum capture receiver 500 may comprise variable gain amplifiers 505a, 505b, multiplexers 506a, 506b, I/Q RF receive processing chain modules 508a, 508b, local oscillator generator (LOGEN) 509, channelizers 510a, 510b, and a processor 514. The variable gain amplifier 505a, the multiplexer 506a, the I/Q RF receive processing chain module 508a, and the channelizer 510a may be operable to handle the processing of signals received via the antenna 210 (FIG. 2). The variable gain amplifier 505b, the multiplexer 506b, the I/Q RF receive processing chain module 508b, and the channelizer 510b may be operable to handle the processing of signals received via the antenna 210 (FIG. 2).

The variable gain amplifiers 505a, 505b may comprise suitable logic, circuitry, interfaces and/or code that may be operable to variably adjust a corresponding gain of the signals that may be received from the antennas 206a, 206b. For example, the variable gain amplifiers 505a may be operable to amplify and/or buffer the signal received via the antenna 210a. The variable gain amplifiers 505a, 505b may operate in different modes that enable capturing of different size bandwidths. For example, the variable gain amplifiers 505a, 505b may be configured to capture narrowband signals or broadband signals. The variable gain amplifiers 505a, 505b may be operable to provide sufficient gain across the entire spectrum of interest (e.g., across all the channels used for ATSC, QAM, etc).

The multiplexers 506a, 506b may comprise suitable logic, circuitry, interfaces and/or code that may be operable to select from among a plurality of n processing RF receive (RX) chains in the I/Q RF receive processing chain modules 508a, 508b, respectively, where n is an integer. For example, the multiplexers 506a may be operable to select which of the plurality of the n processing RF receive (RX) chains within the I/Q RF receive processing chain modules 508a are to be utilized for demodulation of the signal output from the multiplexer 506a. Similarly, the multiplexers 506b may be operable to select which of the plurality of the n processing RF receive (RX) chains within the I/Q RF receive processing chain modules 508b are to be utilized for demodulation of the signal output from the multiplexer 506b. The processor 514 may be operable to control which of the plurality of n processing RF receive (RX) chain in the n I/Q RF receive processing chain modules 508a, 508b may be selected.

The I/Q RF receive processing chain modules 508a, 508b may comprise suitable logic circuitry interfaces and/or code that may be operable to demodulate the signals that are output from the multiplexer 506a, 506b, respectively. Each of the I/Q RF receive processing chain modules 508a, 508b may comprise a plurality of n I/Q RF receive processing chains. The processor 514 may be operable to select which of the I/Q RF receive processing chain modules 508a, 508b are to be utilized to demodulate the signals that are output from the multiplexers 506a, 506b. For example, the I/Q RF receive processing chain module 508a may be utilized to demodulate the signals that are output from the multiplexer 506a, while the I/Q RF receive processing chain module 508b may be utilized to demodulate the signals that are output from the multiplexer 506b.

The local oscillator generator (LOGEN) 509 may comprise suitable logic, circuitry, interfaces and/or code that may be operable to drive one or more oscillators within the I/Q RF receive processing chain modules 508a, 508b. The local oscillator generator 509 may comprise, for example, one or more crystals, one or more direct digital synthesizers, and/or one or more phase-locked loops.

The channelizers 510a, 510b may comprise suitable logic, circuitry, interfaces and/or code that may be operable to channelize the demodulated signals that are output from the n I/Q RF receive processing chain 508a, 508b, respectively. The channelizers 510a, 510b may be operable to separate each of the corresponding channels into a plurality of frequency bins. The output of the channelizers 510a, 510b may be combined by a combiner. In accordance with an exemplary embodiment of the disclosure, the channelization may be achieved via one or more digital filtering algorithms and/or other digital signal processing algorithms. Each of the channelizers 510a, 510b may comprise a plurality of band selection filters that are operable to process the corresponding output from the plurality of n processing RF receive (RX) chains in the n I/Q RF receive processing chain modules 508a, 508b in order to recover a corresponding one of the a plurality of selected frequency bands or frequency bins. The granularity of the channelizers $510a$, $510b$ may be programmable. In this regard, the channelizers $510a$, $510b$ may be programmed to handle channels of varying bandwidth. For example, the channelizers $510a$, $510b$ may be programmed to handle 20 MHz and/or 40 MHz channels. The output from the channelizers $510a$, $510b$ may be communicated to the diversity combiner 208 (FIG. 2).

The processor 514 may comprise suitable logic, circuitry, interfaces and/or code that may be operable to function as a controller for the full spectrum capture receiver 500. In this regard, the processor 514 may be operable to control, configure and/or manage operation of one or more of the variable gain amplifiers $505a$, $505b$, the multiplexers $506a$, $506b$, the I/Q RF receive processing chain modules $508a$, $508b$, the local oscillator generator 509, and/or the channelizers $510a$, $510b$. The processor 514 may be operable to control, configure and/or manage operation of one or more of the components in the I/Q RF receive processing chain modules $508a$, $508b$ such as mixers, filters and/or analog to digital controllers (ADCs). The processor 514 may comprise a baseband processor.

Figure 6:
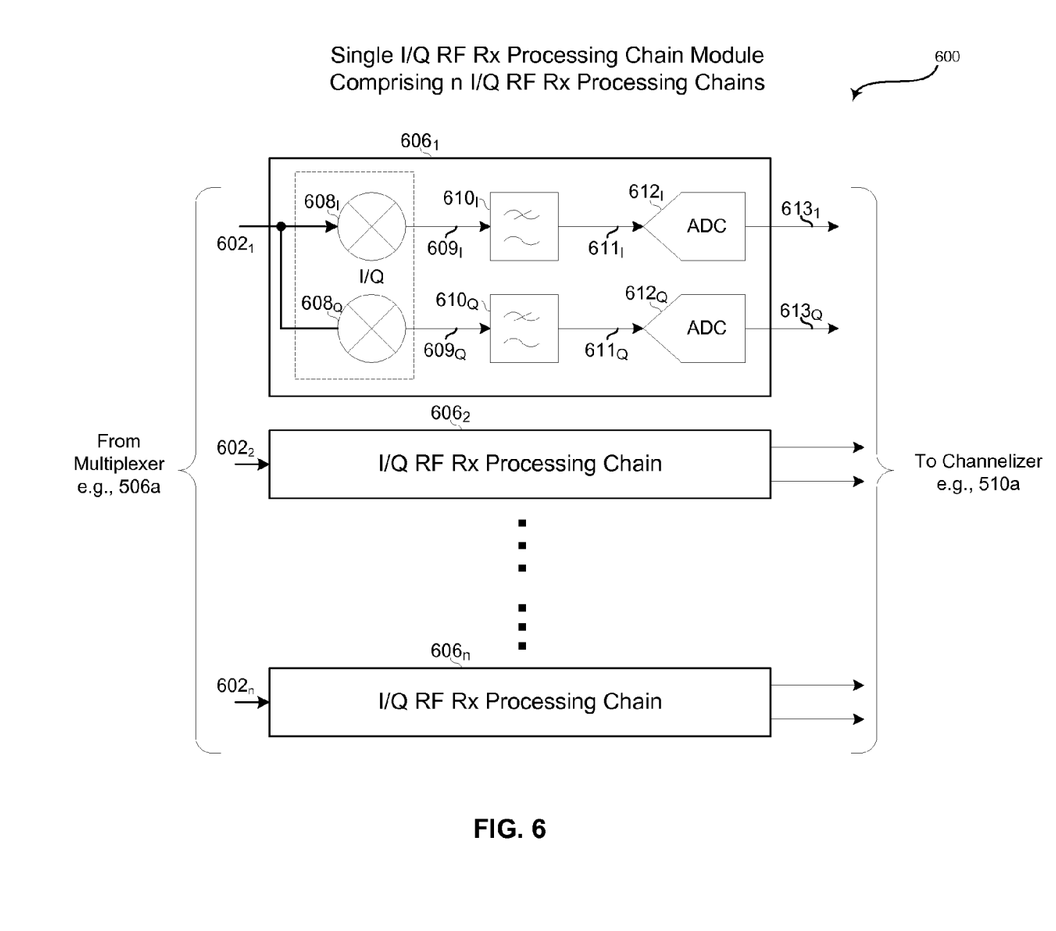
FIG. 6 is a block diagram of an exemplary I/Q RF receive processing chain module of a full spectrum capture receiver, in accordance with an exemplary embodiment of the disclosure.

FIG. 6 is a block diagram of an exemplary I/Q RF receive processing chain module of a full spectrum capture receiver, in accordance with an exemplary embodiment of the invention. Referring to FIG. 6, there is shown an I/Q RF receive processing chain module 600. The I/Q RF receive processing chain module 600 comprises a plurality of n I/Q RF receive processing chains, where n is an integer. The plurality of n I/Q RF receive processing chains are referenced as $606_1$, $606_2$, . . . , $606_n$. Each of the n I/Q RF receive processing chains $606_1$, $606_2$, . . . , $606_n$ are substantially similar.

The I/Q RF receive processing chains $606_1$ comprises an in-phase (I) path and a quadrature (Q) path. The in-phase path of the I/Q RF receive processing chains $606_1$ comprises a mixer $608_1$, a filter $610_1$, and an analog to digital converter (ADC) $612_1$. The quadrature path of the I/Q RF receive processing chains $606_1$ comprises a mixer $608_Q$, a filter $610_Q$, and an analog to digital converter (ADC) $612_Q$.

Each of the mixers $608_I$, $608_Q$ may comprise suitable logic, circuitry, interfaces and/or code that may be operable to mix the corresponding signal $602_1$ with a local oscillator signal (not shown) to generate the quadrature signal $609_I$, $609_Q$, respectively. The mixers $608_I$, $608_Q$ are operable to mix the signal $602_1$ with a pair of in-phase (I) and quadrature (Q) local oscillator signals, respectively, to generate the corresponding pair of in-phase and quadrature signals $609_I$, $609_Q$.

In some embodiments of the disclosure, the mixers in each of the I/Q RF receive processing chains may be operable to function with similar characteristics and in other embodiments of the invention, the mixers in each of the I/Q RF receive processing chains may be operable to function with different characteristics. For example, the mixers $608_I$, $608_Q$ may be configured to operate with a higher bandwidth than the mixers (not shown), which may be within the I/Q RF receive processing chain $606_2$. Similarly, the mixers (not shown), which may be within the I/Q RF receive processing chain $606_2$ may be configured to operate with a higher bandwidth than the mixers (not shown), which may be within the I/Q RF receive processing chain $606_n$, and the mixers $608_I$, $608_Q$, which may be within the I/Q RF receive processing chain $606_Q$.

The phase and/or frequency of the local oscillator signals (not shown), which are input to the mixers in each of the I/Q RF receive processing chains $606_1$, $606_2$, . . . , $606_n$, may be controlled via one or more signals from the processor 514, which is illustrated in FIG. 5. In accordance with various embodiments of the disclosure, the phase and/or frequency of the local oscillator signals, which are input to the mixers in each of the I/Q RF receive processing chains $606_1$, $606_2$, . . . , $606_n$, may be controlled by the processor 514 (FIG. 5) based on which one or more terrestrial television channels (e.g., ATSC channels) have been selected for consumption by one or more customer premises equipment. The phase and/or frequency of the local oscillator signals, which are input to the mixers in each of the I/Q RF receive processing chains $606_1$, $606_2$, . . . , $606_n$, may be controlled by the processor 514 based, for example, on the number of terrestrial television channels, which the full spectrum capture receiver $206a$, $206b$ (FIG. 2) have been instructed to, or tuned to, capture. The phase and/or frequency of the local oscillator signals, which are input to the mixers in each of the I/Q RF receive processing chains $606_1$, $606_2$, . . . , $606_n$, may be generated from the LOGEN 509, which is illustrated in FIG. 5.

The filters in each of the I/Q RF receive processing chains $606_1$, $606_2$, . . . , $606_n$ may comprise suitable logic, circuitry, interfaces and/or code that may be operable to filter out undesired frequencies from the corresponding signals that are output from the oscillators in each of the I/Q RF receive processing chains $606_1$, $606_2$, . . . , $606_n$. For example, each of the filters $610_I$, $610_Q$ in the I/Q RF receive processing chain $606_1$ may be operable to filter out undesired frequencies from the signals $609_I$, $609_Q$ to generate the corresponding analog signals $611_I$, $611_Q$.

In some embodiments of the invention, the filters in each of the I/Q RF receive processing chains $606_1$, $606_2$, . . . , $606_n$ may be operable to function with similar characteristics and in other embodiments of the invention, the filters in each of the I/Q RF receive processing chains $606_1$, $606_2$, . . . , $606_n$ may be operable to function with different characteristics. For example, the filters $610_I$, $610_Q$, which are within the I/Q RF receive processing chains $606_1$, may be configured to operate with a higher bandwidth than the filters (not shown), which may be within the I/Q RF receive processing chain $606_2$. Similarly, the filters (not shown), which may be within the I/Q RF receive processing chain $606_2$ may be configured to operate with a higher bandwidth than the mixers (not shown), which may be within the I/Q RF receive processing chain $606_n$, and the mixers $610_I$, $610_Q$, which may be within the I/Q RF receive processing chain $606_n$.

The ADCs in each of the I/Q RF receive processing chains $606_1$, $606_2$, . . . , $606_n$ may comprise suitable logic, circuitry, interfaces and/or code that may be operable to convert the analog signals from the corresponding signals that are output from the filters in each of the I/Q RF receive processing chains $606_1$, $606_2$, . . . , $606_n$. For example, each of the ADC $612_I$, $612_Q$ in the I/Q RF receive processing chains $606_1$ may be operable to convert the analog signals $611_I$, $611_Q$ to the corresponding digital signals $613_I$, $613_Q$. The ADCs may be preceded by a frequency conversion step and a filtering step to shift a higher frequency band to a lower frequency or baseband, where it is easier to design wideband data converters. The analog to digital converter may be operable to digitize the entire spectrum, which is captured by the full spectrum receivers $206a$, $206b$ (FIG. 2). The ADC may, for example, be as described in U.S. patent application Ser. No. 13/485,003 and/or U.S. patent application Ser. No. 13/336,451, each of which is hereby incorporated by reference herein in its entirety.

In some embodiments of the disclosure, the ADCs in each of the I/Q RF receive processing chains $606_1$, $606_2$, . . . , $606_n$ may be operable to function with similar characteristics and in other embodiments of the invention, the ADCs in each of the I/Q RF receive processing chains $606_1$, $606_2$, ..., $606_n$ may be operable to function with different characteristics. For example, the ADCs $612_I$, $612_Q$, which are within the I/Q RF receive processing chains $606_1$, may be configured to operate with a higher bandwidth than the ADCs (not shown), which may be within the I/Q RF receive processing chain $606_2$. Similarly, the ADCs (not shown), which may be within the I/Q RF receive processing chain $606_2$ may be configured to operate with a higher bandwidth than the ADCs (not shown), which may be within the I/Q RF receive processing chain $606_n$, and the ADC $612_I$, $612_Q$, which may be within the I/Q RF receive processing chain $606_Q$.

In operation, the customer premises equipment 104 (FIG. 1) may instruct the full spectrum capture receivers 210a, 210b to capture a specified number of terrestrial television channels. In this regard, the processor 514 (FIG. 5) may be operable to configure the multiplexers 506a, 506b (FIG. 5), which feeds the I/Q RF receive processing chains $606_1$, $606_2$, ..., $606_n$ to select and enable a corresponding number of the I/Q RF receive processing chains $606_1$, $606_2$, ..., $606_n$, which are to be utilized to handle reception and demodulation of the specified number of terrestrial television channels. In some embodiments of the disclosure, only those I/Q RF receive processing chains $606_1$, $606_2$, ..., $606_n$ which are selected by the processor 514 are powered and any remaining ones of the I/Q RF receive processing chains $606_1$, $606_2$, ..., $606_n$ that are not selected are powered down.

U.S. application Ser. No. 13/356,265, which was filed on Jan. 23, 2012 discloses operation of an exemplary full spectrum receiver, and is hereby incorporated herein by reference in its entirety.

Figure 7:
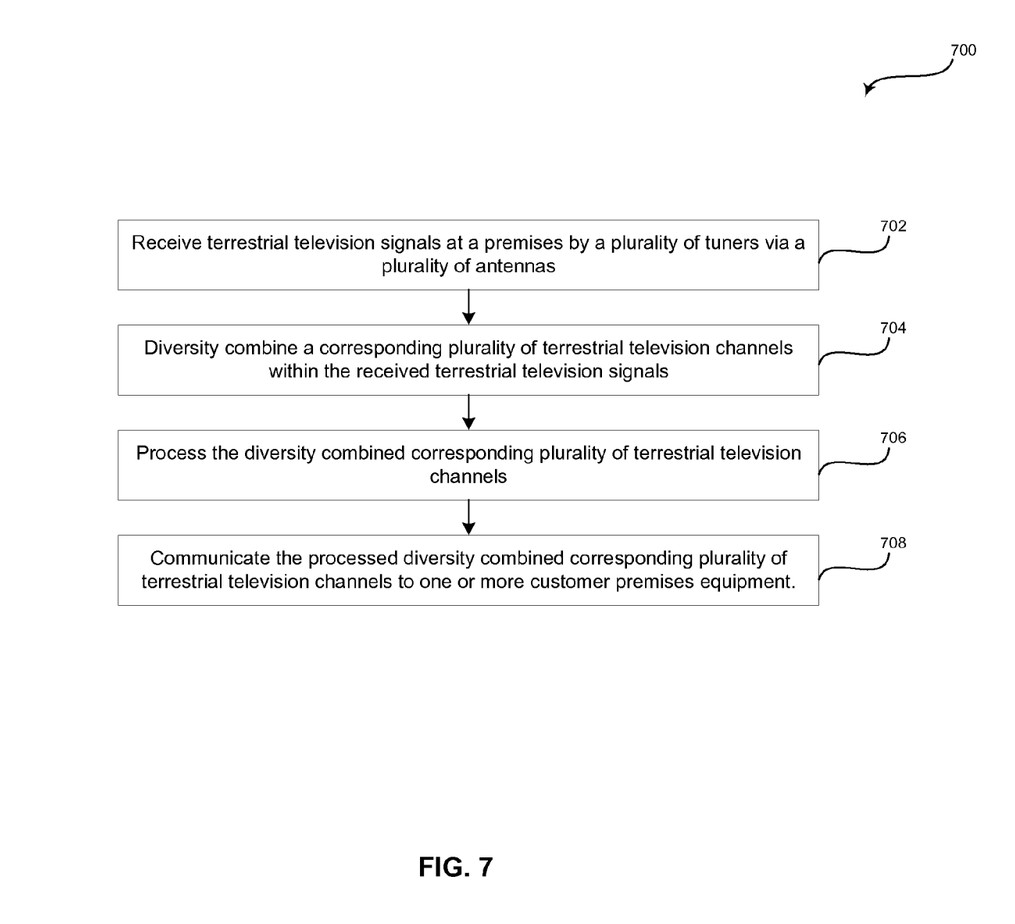
FIG. 7 is a flow chart illustrating exemplary steps for utilizing a diversity receiver to handle terrestrial television channels, in accordance with an exemplary embodiment of the disclosure.

FIG. 7 is a flow chart illustrating exemplary steps for utilizing a diversity receiver to handle terrestrial television channels, in accordance with an exemplary embodiment of the disclosure. Referring to FIG. 7, there is shown a flow chart 700 comprising exemplary steps 702 through 708. In step 702, terrestrial television signals are received at a premises by a plurality of tuners via a plurality of antennas. In step 704, a corresponding plurality of terrestrial television channels within the received terrestrial television signals are combined. In step 706, the diversity combined corresponding plurality of terrestrial television channels are processed. In step 708, the processed diversity combined corresponding plurality of terrestrial television channels are communicated to one or more customer premises equipment.

Figure 8:
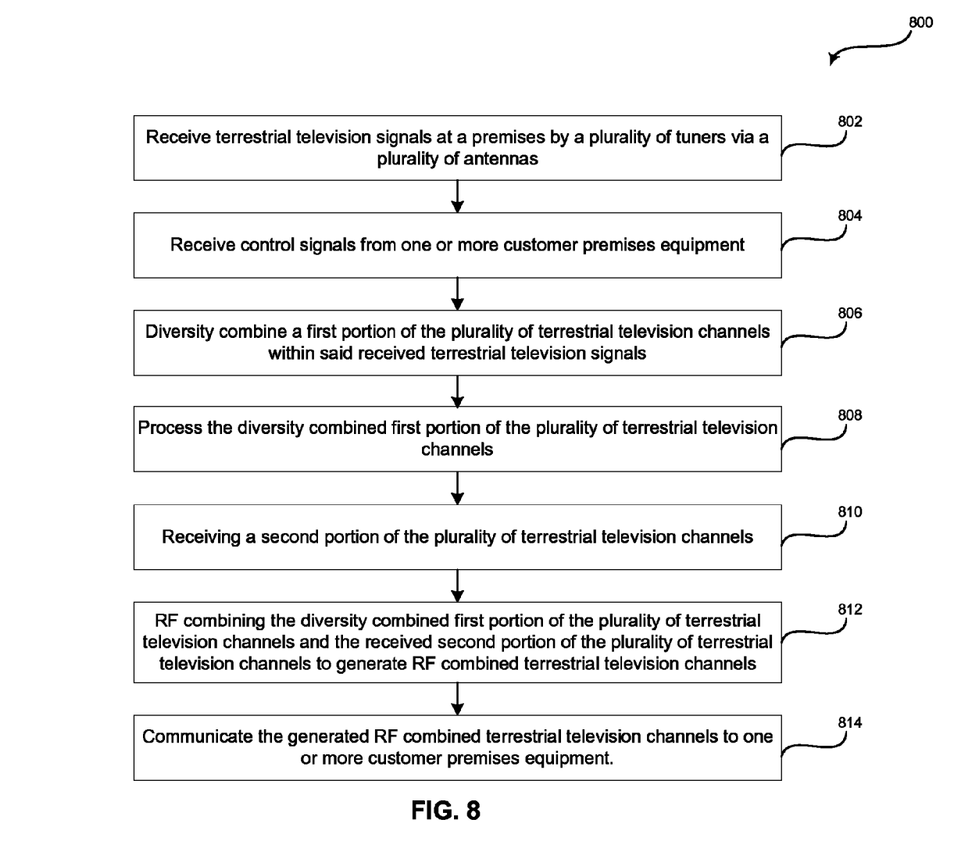
FIG. 8 is a flow chart illustrating exemplary steps for utilizing a diversity receiver to handle terrestrial television channels, in accordance with an exemplary embodiment of the disclosure.

FIG. 8 is a flow chart illustrating exemplary steps for utilizing a diversity receiver to handle terrestrial television channels, in accordance with an exemplary embodiment of the disclosure. Referring to FIG. 8, there is shown a flow chart 800 comprising exemplary steps 802 through 814. In step 802, terrestrial television signals are received at a premises by a plurality of tuners via a plurality of antennas. In step 804, control signals are received from one or more customer premises equipment. In step 806, a first portion of the plurality of terrestrial television channels within the received terrestrial television signals are diversity combined. In step 808, the diversity combined first portion of the plurality of terrestrial television channels may be processed. In step 810, a second portion of the plurality of terrestrial television channels may be received. In step 812, the diversity combined first portion of the plurality of terrestrial television channels and the received second portion of the plurality of terrestrial television channels are RF combined to generate RF combined terrestrial television channels. In step 814, the generated RF combined terrestrial television channels may be communicated to one or more customer premises equipment.

In accordance with various exemplary embodiments of the disclosure, a terrestrial receiver 202 (FIG. 2) at a premises may comprise a plurality of antennas 210a, 210b, a corresponding plurality of tuners 206a, 206b, and a diversity combiner 208. The terrestrial receiver 202 may be operable to receive terrestrial television signals via the plurality of antennas 210a, 210b and the plurality of tuners 206a, 206b and utilize the diversity combiner 208 to diversity combine a corresponding plurality of terrestrial television channels within the received terrestrial television signals. The terrestrial receiver 202 may be operable to process the diversity combined corresponding plurality of terrestrial television channels and communicate the processed diversity combined corresponding plurality of terrestrial television channels to one or more customer premises equipment (e.g., 104, FIG. 1). The diversity combined corresponding plurality of terrestrial television channels may be remodulated by the spectrum reconstructor 209, and converted by the DAC 212 to corresponding analog signals prior to being communicated to the one or more customer premises equipment (e.g., 104, FIG. 1). The diversity combined corresponding plurality of terrestrial television channels may be demodulated by the demodulator 413 (FIG. 4) and converted to intermediate frequency signals by the IF generator 415 (FIG. 4) prior to being communicated to the one or more customer premises equipment (e.g., 104, FIG. 1).

The terrestrial receiver 202 may be operable to receive one or more control signals from the one or more customer premises equipment (e.g., 104, FIG. 1). One or more first of the plurality of terrestrial television channels within the received terrestrial television signals may be diversity combined based on the received one or more control signals from the one or more customer premises equipment (e.g., 104, FIG. 1). The diversity combined one or more first of the plurality of terrestrial television channels may be converted to corresponding first analog signals by the DAC 312 (FIG. 3). One or more second plurality of terrestrial television channels may be received by a radio frequency combiner 320 (FIG. 3). The radio frequency combiner 320 may be operable to radio frequency combine the corresponding first analog signals and the received one or more second plurality of terrestrial television channels. The one or more first of the plurality of terrestrial television channels are different from the one or more second plurality of terrestrial television channels that may be received by the radio frequency combiner. The combined corresponding first analog signals and the received one or more second plurality of terrestrial television channels may be communicated to the one or more customer premises equipment (e.g., 104, FIG. 1).

The diversity combiner 208 may be operable to diversity combine the corresponding plurality of terrestrial television channels within the received terrestrial television signals utilizing coarse FFT processing. The diversity combiner 208 may be operable to perform diversity combining of the corresponding plurality of terrestrial television channels within the received terrestrial television signals by combining a plurality of the terrestrial television signals from a plurality of frequency bins for the plurality of antennas to generate maximum ratio combined co-phased signals. The diversity combiner 208 may be operable to perform channel stacking and/or band stacking on the plurality of frequency bins for diversity combining of the corresponding plurality of terrestrial television channels within the received terrestrial television signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for diversity combining for high-performance signal reception.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    in a terrestrial receiver at a premises, said terrestrial receiver comprising a plurality of antennas, each antenna in the plurality of antennas corresponding to a plurality of tuners:
        receiving a signal spanning a frequency range corresponding to a plurality of terrestrial television frequency channels via each antenna in the plurality of antennas and the corresponding plurality of tuners;
        demodulating one or more frequency channels from each antenna in the plurality of antennas;
        diversity combining the demodulated one or more frequency channels from each antenna in the plurality of antennas;
        remodulating said one or more diversity combined frequency channels in accordance with protocols used for generation of said received signal, said remodulating resulting in a remodulated signal that spans said frequency range and contains only the one or more remodulated frequency channels, such that customer premises equipment can receive said remodulated signal via a terrestrial television antenna port of said customer premises equipment and recover content from the one or more remodulated frequency channels in said remodulated signal;
        communicating said remodulated signal to said customer premises equipment.

2. The method according to claim 1, comprising receiving one or more control signals from said one or more customer premises equipment.

3. The method according to claim 1, wherein said remodulating comprises converting said remodulated signal to an analog representation.

4. A system for communication, the system comprising:
    one or more circuits for use in a terrestrial receiver at a premises, wherein said terrestrial receiver comprises a plurality of antennas, each of said one or more circuits comprising a corresponding plurality of tuners, said one or more circuits being operable to:
        receive a signal spanning a plurality of terrestrial television frequency channels via said plurality of antennas and the corresponding plurality of tuners;
        demodulate one or more frequency channels from each antenna in the plurality of antennas;
        diversity combine the demodulated one or more frequency channels from each antenna in the plurality of antennas;
        remodulate said one or more diversity combined frequency channels in accordance with protocols used for generation of said received signal, said remodulation resulting in a remodulated signal that spans said frequency range and contains only the one or more remodulated frequency channels, such that customer premises equipment can receive said remodulated signal via a terrestrial television antenna port of said customer premises equipment and recover content from the one or more remodulated frequency channels in said remodulated signal; communicate said remodulated signal to said customer premises equipment.

5. The system according to claim 4, wherein said one or more circuits are operable to: receive one or more control signals from said one or more customer premises equipment.

6. The system according to claim 4, wherein said remodulation comprises conversion of said remodulated signal to an analog signal.

7. A system for communication, the system comprising:
a terrestrial receiver at a premises, said terrestrial receiver comprising a plurality of antennas and a diversity combiner, each antenna in the plurality of antennas corresponding to a plurality of tuners:
  each said plurality of tuners being operable to receive a signal spanning a plurality of terrestrial television frequency channels via said plurality of antennas and demodulate one or more frequency channels;
  said diversity combiner being operable to diversity combine said one or more frequency channels;
a remodulation circuit operable to remodulate said diversity combined one or more frequency channels in accordance with protocols used for generation of said received signal, said remodulation resulting in a remodulated signal that spans said frequency range and contains only the one or more remodulated frequency channels, such that customer premises equipment can receive said remodulated signal via a terrestrial television antenna port of said customer premises equipment and recover content from the one or more remodulated frequency channels in said remodulated signal; and
said terrestrial receiver is operable to communicate said remodulated signal to said customer premises equipment.

8. The method of claim 1, wherein each of said plurality of tuners comprises an analog-to-digital converter operable to digitize said frequency range to generate a digitized spectrum.

9. The method of claim 1, wherein each tuner of each of said plurality of tuners comprises a channelizer operable to select a frequency channel from a digitized spectrum.

10. The method of claim 1, wherein said frequency range spans from 54 MHz to 889.75 MHz.

11. The system of claim 4, wherein each of said plurality of tuners comprises an analog-to-digital converter operable to digitize said frequency range to generate a digitized spectrum.

12. The system of claim 4, wherein each tuner of each of said plurality of tuners comprises a channelizer operable to select a frequency channel from a digitized spectrum.

13. The system of claim 4, wherein said frequency range spans from 54 MHz to 889.75 MHz.

14. The system of claim 7, wherein each of said plurality of tuners comprises an analog-to-digital converter operable to digitize said frequency range to generate a digitized spectrum.

15. The system of claim 7, wherein each tuner of each of said plurality of tuners comprises a channelizer operable to select a frequency channel from a digitized spectrum.

16. The system of claim 7, wherein said frequency range spans from 54 MHz to 889.75 MHz.

* * * * *